Sept. 6, 1960     R. H. WISE     2,951,667

MOTOR MOUNTING

Filed Nov. 9, 1956

INVENTOR.
RALPH H. WISE
BY Redrow & Recktenwald
ATTORNEYS

United States Patent Office 2,951,667
Patented Sept. 6, 1960

2,951,667

MOTOR MOUNTING

Ralph H. Wise, Gary, Ind., assignor, by mesne assignments, to The Anderson Company, a corporation of Indiana Filed Nov. 9, 1956, Ser. No. 621,287

8 Claims. (Cl. 248—15)

This invention relates to motor mountings and more specifically to a means for resiliently mounting a motor relative to a base.

Under certain conditions of use, a drive shaft of a motor, such as an electric motor, must be substantially aligned with a driven shaft in order to secure the maximum output of the motor with the least amount of noise and interference. Likewise, under other conditions of use, the motor drive shaft may be disposed at an angle to, or may even be disposed parallel to, the driven shaft whereupon a universal coupling is provided therebetween which is designed to transmit the maximum force to a work piece efficiently and quietly. Under any condition of use, it may be necessary that the base upon which the motor, the drive and driven shafts, and the work piece are mounted, be movable and sometimes subjected to a rough shock incident to coming suddenly to rest whereby the motor and drive system are subjected to large distorting forces. The best example of this type of treatment is the mounting of the motor and drive system inside the door of an automobile for raising and lowering the glass, wherein the drive system must be mounted so as to be substantially shockproof.

Up to the present time, in such installations, the motors have been rigidly mounted inside the doors of the automobiles with the result that, due to the weight of the motor, they are frequently caused to become misaligned or torn from their mountings when the door is slammed shut. The misalignment problem is particularly important in certain applications in that noise and interference caused thereby is highly objectionable, for example, in today's higher priced automobiles.

My copending applicatoin Serial No. 583,136, filed May 7, 1956, for Motion-Transmitting Device is a typical example of the type of system to which this improved mounting is particularly, but not exclusively, adapted.

It is, therefore, a particular object of my invention to overcome the above-noted disadvantage of the prior art and to provide an improved resilient, but yet firm, mounting for a motor.

It is another object of this invention to provide a motor mounting for an element, such as an automobile door structure, wherein the mounting means for the motor will yieldingly absorb not only the initial reaction torque and thrust of a reversible motor, but also the shock incident to stopping the movement of the element and the associated supporting means for said motor.

It is still another object of this invention to provide a motor mounting means that can accommodate reasonable variations in tolerances and yet be installed quickly and cheaply without affecting the operativeness of the system.

It is a further object of this invention to provide a motor mounting consisting of few parts which can be economically manufactured and assembled on a production basis.

It is a still further object of the invention to provide a resiliently yieldable mounting which is durable, efficient, and positive in action.

These and other objects and advantages of the invention will become apparent as the description of the same proceeds, and the invention will be best understood from a consideration of the following detailed description taken in connection with the accompanying drawing forming part of this specification, with the understanding, however, that the invention is not confined to any strict conformity with the showing of the drawing, but may be changed or modified so long as such changes or modifications mark no material departure from the salient features of the invention as expressed in the appended claims.

Figure 1:
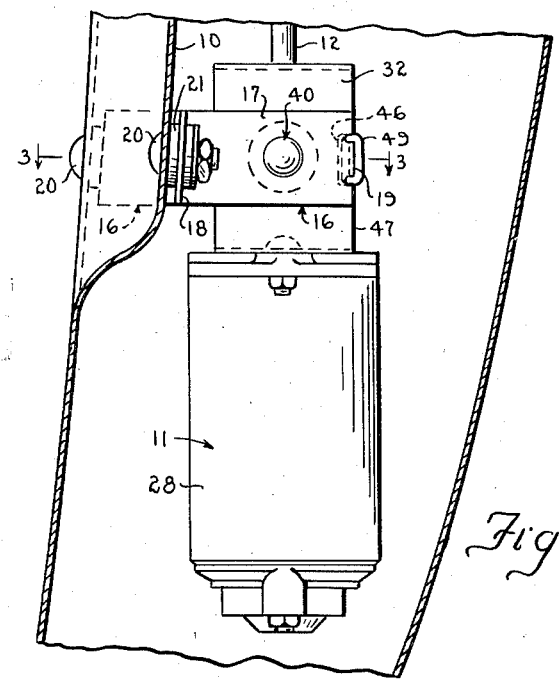
Figure 1 is a view in side elevation of the motor housing mounting means attached to the inside of an automobile door and embodying the present invention.
Figure 5:
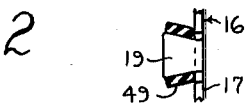
Figure 5 is a sectional view taken upon the line 5—5 in Figure 3.

Referring to Figure 1, a typical structure making use of this invention is represented wherein a portion of an automobile door is shown with the inside door panel 10 designed to support a motor 11 in substantial alignment with a driven shaft 12. The shaft 12 is preferably connected through a universal coupling 13 with the motor drive shaft 14. The driven shaft 12 is adapted in turn to drive a mechanism designed to move a window either up or down depending upon the direction of rotation of the motor.

The motor, as illustrated, is of the reversible type such that upon being actuated in either a clockwise or counterclockwise directoin to raise or lower the window, a reaction thrust is created that is transmitted through the motor support to the base or door panel 10. If the motor were rigidly supported on the panel, it would tend to ultimately work itself loose since the thickness of the ordinary door panel is not such as would be adapted to provide the necessary permanent support. Should the motor ever become loose on its base, it would become easily misaligned with the work piece, thus creating noise and other mechanical troubles.

To overcome the just-enumerated difficulty, the present invention was made, and in following this teaching, a pair of support arms or members 16 are illustrated, each one comprising a body portion 17 having a flange portion 18 projecting at a right angle from one end thereof and having a lug or stop 19 projecting at a right angle in the opposite direction from the other end thereof. Each of the support members 16, which are disposed in spaced-apart relationship so that the lug 19 on one projects in the direction of and is substantially aligned with the lug on the other, is resiliently attached to the base 10 of the door by means of a bolt 20 passing through a cylindrically shaped resilient washer 21. The washer has a continuous groove 22 on its outer peripheral portion adapted to engage the flanged portion 18 of said support by co-operation with an aperture 23 provided in the flange. The resilient washer 21, which may be made of rubber, synthetic resilient materials, or the like, has an opening 24 passing therethrough along an axis lying perpendicular to the plane of said groove 22 into which opening 24 a hollow rigid spacing member 25 is nested so that in tightening a nut 26 against a stiff washer 26' on the bolt 20 for securing the support member 16 to the base, it is possible to get some degree of rigidity of mounting without compressing the resilient washer to a degree such that it is no longer able to serve any useful shock-absorbing purpose. The spacer 25 is slightly shorter in length than the thickness dimension of the resilient washer 21 so that in drawing the nut upon the bolt, the resilient washer will be compressed a predetermined amount just sufficient to provide a firm support for the motor. The body portions 17 of the supports 16 have a pair of apertures 27 formed therethrough in substantial alignment with each other for a purpose to be hereinafter described.

Figure 3:
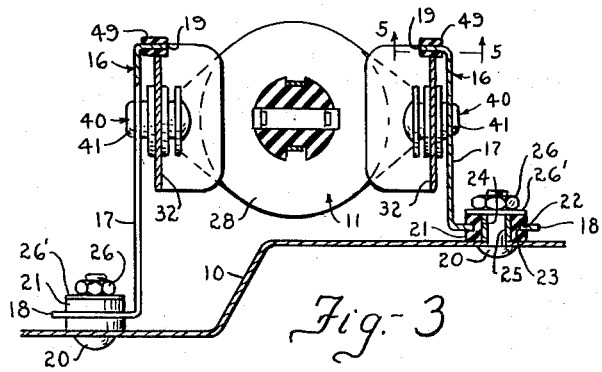
Figure 3 is a sectional view taken upon the line 3—3 of Figure 1.
Figure 4:
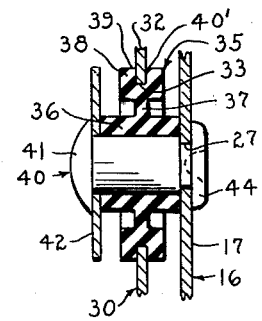
Figure 4 is a sectional view taken upon the line 4—4 in Figure 2.
Figure 6:
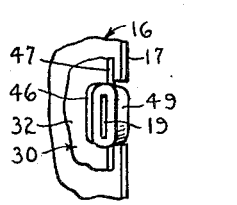
Figure 6 is a perspective view of one element of the invention.
Figure 2:
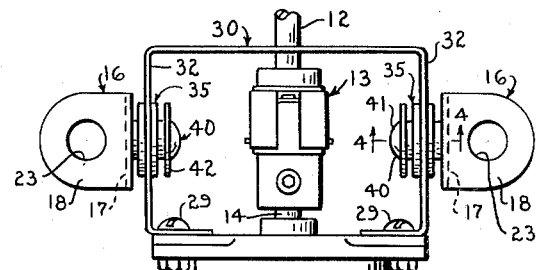
Figure 2 is a view in front elevation of the mounting shown in Figure 1.

The motor 11 has a motor housing 28 which, as shown best in Figure 2, is attached to a substantially rectangularly shaped bearing bracket 30 by means of screws 29. The bracket 30 is constructed with opposite side wall or leg portions 32 which have a pair of aligned apertures 33 formed therein, the apertures having a common axis which intersects with and, in the example shown, is perpendicular to the axis of the drive shaft of the motor 11. A flexible mount 35, such as shown in Figure 4, is preferably seated in each of said apertures 33, this mounting being composed of a hollow tubular member 36 connected substantially midway of its length by a web 37 to an enlarged ring member 38 which has a groove 39 formed in its outer circumferential wall 40' for receiving side wall portions 32 in nested relationship therewith. The thickness of the ring portion 38 of the mount 35 is somewhat less than the axial length of the tubular member 36 so that the web 37 between the washer 38 and the tubular portion 36 can be flexed to permit relative movement between the respective parts attached to said tubular member 36 and the ring member 38.

The motor 11 and its bracket 30 are attached to the support members 16 by means of a pair of pivot pins or rivets 40 which extend through the tubular member 36 of the flexible mounting 35. Each pivot pin 40 has a head 41 holding a washer 42 against one end of the tubular member 36 of the mount 35 with the body portion of the pin 40 passing therethrough and through the aperture 27 in one of the support members 16 and being upset or otherwise provided with an enlargement 44 on the other end thereof for holding the bearing bracket 30 and support members 16 in resiliently and pivotally mounted relationship relative to each other. The just-enumerated mounting substantially eliminates the transmission of reaction thrust forces or vibrations from the motor 11 to the base 10 and at the same time provides a flexible support that is capable of permitting continued self-alignment of the motor and work piece.

A further feature of the invention provides for a dampening means for the shock loads transmitted transversely to the motor, such for instance as the shock created upon slamming the door of an automobile. Since the motor 11 is comparatively heavy and for the sake of simplicity is mounted such that the center of gravity is below the pivot axis thereof, any rapid movement imposed on the entire system may produce an acceleration or deceleration, when, for instance, the door is slammed upon being shut. This, as is apparent, will swing the motor about the axis formed on pins 40 with such force as would normally rupture, or at least severely strain, the universal coupling 13. In unusual cases, if it were not for the mounting here shown, the forces might be great enough to tear the motor loose from its mountings. To overcome this problem, however, a pair of aligned recesses 46 are cut into the edges 47 of the diametrically opposite side wall portions 32 of the bearing bracket 30 and said recesses 46 are of such a size as to permit the lugs 19 on each of the relatively fixed support members 16 to be nested therein so that when the motor 11 starts to pivot about the axis passing through the pins 40, one edge of each lug 19 will engage with one edge of each recess 46 to restrict the arc of swing of the motor to a tolerable limit.

As a means to further improve the operation of the motor mounting and swing limiting or controlling means above described, a resilient bumper 49 is secured around each lug 19 in such a manner that the contacting edges of the lug 19 are cushioned with respect to the contacting edges of the recesses in the bearing bracket. In order to prevent the bumper 49 from becoming detached from the lug 19, a taper or undercut is provided in the edges of the lug 19 sloping outwardly away from the base thereof at approximately a 5° angle so that the outer dimension of the lug 19 is wider than the neck portion. The bumper 49 is a tubular piece of material such that when snapped over the lug 19, the shape of the lug will keep the bumper 49 always seated thereon. The bumpers 49 serve not only to absorb a certain amount of the shock created when the motor 11 attempts to pivot about the axis of the pins 40, but also eliminate a "clicking" noise created by the metal-to-metal contact between the lugs and the edges of the recesses formed in the bearing bracket.

When the motor 11 is started for instance, in any particular direction (clockwise or counterclockwise), the reaction thrust of the motor housing will attempt to cause the bearing bracket 30 to rotate about the axis of the drive shaft 12; however, the resilient mounts 35 will be compressed on one side and stretched on the other so as to absorb a substantial amount of the shock therein. A small amount of shock may be transmitted through the pins to the support members 16 and into the resilient washers 21 which will, to all intents and purposes, absorb the majority of the remaining forces without transmitting any noticeable portion of this reaction to the base.

On the other hand, when the automobile door is opened and thereafter closed with a slamming action, the motor will attempt to pivot about the axis of pins 30 because of the relation of the center of gravity relative thereto, whereupon the lugs 19 will compress the bumpers 49 between the edges of said lugs and the edges of the recesses 46 in the bearing bracket 30 so as to absorb a large part of the shock therein with the rest of the noticeable shock being transmitted through the support members 16 and being absorbed by the resilient washers 21.

Figure 7:
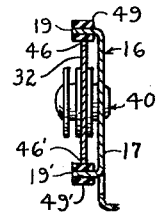
Figure 7 is a modification of one element of the invention.

Figure 7 illustrates a modification of my invention wherein a second lug 19' is upset from the body portion 17 of each support 16 so as to lie substantially parallel to lug 19 in the same direction thereof and is adapted to engage in a recess 46' formed in the other edge of the bracket 32. The lugs 19 and 19' can be covered with bumpers 49 and 49', respectively, so as to cushion the shock and reduce the noise between the support 16 and bracket 32. This modification is designed to further reduce the amount of swing imparted to the motor 11 by a violent slam of the door when the motor is confined in a very limited space so as to prevent the lower end of the motor from striking the inner part of the door.

It will be obvious, due to the novel construction and arrangements of the functional parts of the assembly, that the advantages of the resilient mounting means, the location of the pivot axis, and the position of the interengaging stop means produces an improved motor mounting that not only absorbs the resultant shock loads created by starting and stopping the motor in either a clockwise or a counterclockwise direction, but also absorbs the forces produced upon the development of sudden shock loads which tend to rotate the motor about its pivot axis. The construction thus provides a motor mounting that normally maintains a substantial alignment of the motor with a work piece through any range of abusive conditions which can be anticipated incident to normal use of such a device in the hands of the general public.

Having thus described my invention, it is obvious that various other modifications may be made in the same without departing from the spirit of my invention; hence I do not wish to be understood as limiting myself to the exact forms, constructions, arrangements, and combinations of parts herein shown and described or uses mentioned.

I claim:

1. Means for resiliently mounting a motor between the panels of a vehicle door comprising a pair of spaced parallel supporting arms, means for resiliently mounting one end of each of said arms to one of said panels with the arms projecting into the space between said panels with the free ends of said arms coterminous, an open bracket of generally rectangular outline having one side thereof securable to an end of said motor and extending transverse to the shaft thereof, the sides of said bracket adjoining said last-mentioned side being disposed between said arms and having opposed apertures formed therein, a resilient means fixed in each of said apertures, each resilient means including a tubular element having a ring portion disposed about its medial portion and connected thereto by a flexible web portion, the ring portion having a circumferential channel receiving the edge defining one of said apertures, pivot means extending through said resilient means and pivotally securing said bracket to said arms, the free end of each of said arms being formed with a lug projecting toward the other arm, and a covering of cushioning material sleeved upon each of said lugs, an edge of each apertured side of said bracket being formed with a cutaway portion receiving said lugs, whereby said motor is permitted limited yielding movement.

2. A flexible mounting for a motor comprising a pair of support members, fastening means for securing said support members to a base in spaced-apart relation, a lug formed on each support member and projecting substantially in the direction of the other member, an open bracket of generally rectangular outline having one leg thereof arranged to be fastened to said motor and extending across the shaft thereof, with the side legs of said bracket disposed between said support members, and pivot means carried by each side leg of the bracket pivotally securing the same to said support members, one edge of each of the pivotal side legs of said bracket being formed with an elongate recess receiving said lugs for limited movement therealong, whereby said motor is permitted a controlled amount of movement relative to the base.

3. The apparatus as defined in claim 2, wherein said lugs progressively increase in cross section toward their free ends and a covering of resilient material is sleeved over said lugs.

4. Means for cushioningly mounting a rotary motor comprising a pair of independent support members each including means to resiliently mount said members to project in parallel from a base, a bracket having a mounting portion to be fixed across one end of said motor and including parallel side members contiguous said support members, there being aligned apertures formed in one pair of said members, resilient means held in said apertures, pivot means extending through said resilient means and pivotally securing said bracket to said support members, and means for limiting pivotal movement of said bracket on said support members comprising interengaging rigid stop elements, one element being integral with each of said support members and a cooperating element integral with each of said side members.

5. The apparatus as defined in claim 4 wherein one of said stop elements consists of a lug and the other element is defined by an elongate recess in which said lug is permitted limited movement.

6. The apparatus as defined in claim 5 wherein said lug is provided with a covering of resilient material for yieldingly limiting pivotal movement of said bracket.

7. Means for resiliently mounting a rotary motor with its shaft extending generally vertically, comprising a pair of spaced parallel support members resiliently mounted at one end to project horizontally and with the free ends of said members substantially coterminous, an open bracket of generally rectangular outline having one leg thereof designed to be fastened to one end of said motor and extending transverse to said shaft thereof, the legs of said bracket on either side of said last-mentioned leg having opposed apertures formed therein, resilient means fastened in each of said apertures, and pivot means carried by each of said resilient means and pivotally securing said bracket to said support members, the free ends of each of said support members being formed with a lug projecting toward the other of said members and the apertured legs of said bracket each having a recess formed in an edge thereof and receiving said lugs.

8. The apparatus as defined in claim 7 wherein said lugs are provided with a covering of tough resilient material cushioning the reaction of said bracket against said lugs and permitting limited relative movement therebetween.

References Cited in the file of this patent

UNITED STATES PATENTS

| | | |
|---|---|---|
| 1,526,882 | Trimmer | Feb. 17, 1925 |
| 1,892,943 | Geyer | Jan. 3, 1933 |
| 2,068,994 | Lord | Jan. 26, 1937 |
| 2,208,532 | Woodward | July 16, 1940 |
| 2,315,065 | Livingston | Mar. 30, 1943 |